US012684350B2

(12) United States Patent
Bian et al.

(10) Patent No.: US 12,684,350 B2
(45) Date of Patent: Jul. 14, 2026

(54) SYSTEMS AND METHODS FOR COMMUNICATION IN PASSIVE/SEMI-PASSIVE INTERNET-OF-THINGS

(71) Applicant: ZTE Corporation, Shenzhen (CN)

(72) Inventors: Luanjian Bian, Shenzhen (CN); Bo Dai, Shenzhen (CN); Youjun Hu, Shenzhen (CN); Kun Liu, Shenzhen (CN); Weiwei Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 78 days.

(21) Appl. No.: 18/789,238

(22) Filed: Jul. 30, 2024

(65) Prior Publication Data

US 2024/0388906 A1 Nov. 21, 2024

Related U.S. Application Data

(63) Continuation of application No. PCT/CN2022/104171, filed on Jul. 6, 2022.

(51) Int. Cl.
*H04L 29/06* (2006.01)
*H04W 12/06* (2021.01)

(52) U.S. Cl.
CPC .................................. *H04W 12/06* (2013.01)

(58) Field of Classification Search
None
See application file for complete search history.

(56) References Cited

U.S. PATENT DOCUMENTS

| | | | | |
|---|---|---|---|---|
| 11,039,310 B2 * | 6/2021 | Kim | ...................... | H04W 76/11 |
| 11,800,362 B2 * | 10/2023 | Agarwal | ............... | H04W 12/61 |
| 2009/0305665 A1 * | 12/2009 | Kennedy | ............. | H04L 63/0876 |
| | | | | 455/410 |
| 2010/0257295 A1 * | 10/2010 | Nielsen | ............... | H04L 12/2821 |
| | | | | 710/110 |
| 2013/0281117 A1 | 10/2013 | Shen et al. | | |

(Continued)

FOREIGN PATENT DOCUMENTS

| | | |
|---|---|---|
| CN | 109644134 A | 4/2019 |
| CN | 111342974 A | 6/2020 |

(Continued)

OTHER PUBLICATIONS

Shiwei, Huo et al. A New Trusted Inter-Domain Authentication Scheme for Wireless Networks. 2020 IEEE 3rd International Conference of Safe Production and Informatization (IICSPI). https://ieeexplore.ieee.org/stamp/stamp.jsp?tp=&arnumber=9332334 (Year: 2020).*

(Continued)

*Primary Examiner* — Jeremiah L Avery
(74) *Attorney, Agent, or Firm* — Foley & Lardner LLP

(57) ABSTRACT

Presented are systems and methods for communication in passive/semi-passive Internet-of-Things (IoT). A wireless communication node may determine an identification related to a wireless communication device. The wireless communication node may send an authentication instruction message the wireless communication device. The authentication instruction message may comprise the identification related to the wireless communication device and an identification of the wireless communication node.

12 Claims, 3 Drawing Sheets

(56) References Cited

U.S. PATENT DOCUMENTS

| | | | | |
|---|---|---|---|---|
| 2014/0073288 A1* | 3/2014 | Velasco | H04W 4/02 | |
| | | | 455/411 | |
| 2014/0073289 A1* | 3/2014 | Velasco | H04W 12/04 | |
| | | | 455/411 | |
| 2015/0022314 A1 | 1/2015 | Povolny | | |
| 2016/0094327 A1* | 3/2016 | Han | H04L 1/0073 | |
| | | | 370/329 | |
| 2016/0198432 A1* | 7/2016 | Ranke | H04W 68/005 | |
| | | | 455/458 | |
| 2016/0269359 A1* | 9/2016 | Adrangi | H04L 63/0414 | |
| 2018/0091485 A1* | 3/2018 | Lee | H04L 63/0428 | |
| 2018/0115539 A1* | 4/2018 | Muhanna | H04W 12/041 | |
| 2018/0167915 A1* | 6/2018 | Lee | H04W 12/041 | |
| 2018/0234465 A1* | 8/2018 | Kim | H04L 61/5014 | |
| 2018/0249437 A1* | 8/2018 | Lindskog | G01S 13/878 | |
| 2018/0376444 A1* | 12/2018 | Kim | H04W 76/30 | |
| 2019/0075511 A1* | 3/2019 | Ryu | H04W 68/005 | |
| 2019/0124509 A1 | 4/2019 | Nakarmi et al. | | |
| 2019/0281523 A1* | 9/2019 | Lee | H04W 36/0007 | |
| 2019/0349730 A1* | 11/2019 | Kim | H04W 4/40 | |
| 2019/0364492 A1* | 11/2019 | Azizi | H04W 52/0264 | |
| 2020/0169877 A1* | 5/2020 | Kim | H04W 12/06 | |
| 2020/0374806 A1* | 11/2020 | Manolakos | G01S 5/0205 | |
| 2021/0168753 A1* | 6/2021 | Nakajo | H04W 60/04 | |
| 2021/0235267 A1* | 7/2021 | Kim | H04W 76/50 | |
| 2021/0329002 A1* | 10/2021 | Huh | G06F 21/32 | |
| 2022/0038902 A1* | 2/2022 | Mueck | H04L 63/1433 | |
| 2022/0109512 A1* | 4/2022 | Melodia | G06F 21/6245 | |
| 2022/0131727 A1* | 4/2022 | Khoryaev | H04L 27/261 | |
| 2022/0311488 A1* | 9/2022 | Shreevastav | H04W 64/00 | |
| 2023/0128479 A1* | 4/2023 | Jang | H04W 76/11 | |
| | | | 370/329 | |

FOREIGN PATENT DOCUMENTS

| | | | |
|---|---|---|---|
| CN | 112769762 A | 5/2021 | |
| CN | 112889294 A | 6/2021 | |
| CN | 114257406 A | 3/2022 | |
| EP | 3 045 003 B1 | 4/2017 | |
| JP | H07-023465 A | 1/1995 | |
| JP | H08-242488 A | 9/1996 | |
| JP | 2009-065260 A | 3/2009 | |
| JP | 2020-031298 A | 2/2020 | |
| WO | WO-2015/196372 A1 | 12/2015 | |
| WO | WO-2018/182482 A1 | 10/2018 | |
| WO | WO-2020/030266 A1 | 2/2020 | |
| WO | WO-2021/063399 A1 | 4/2021 | |
| WO | WO-2021/185454 A1 | 9/2021 | |

OTHER PUBLICATIONS

Tian, Ye et al. Identity-based Hierarchical Access Authentication in Mobile IPV6 Networks. 2006 IEEE International Conference on Communications. https://ieeexplore.ieee.org/stamp/stamp.jsp?tp=&arnumber=4024451 (Year: 2006).*

Gouda, Mamdouh, Haggag, Mohamed. Enhanced Authentication Mechanism for Next Generation Networks. 2009 First International Conference on Computational Intelligence, Communication Systems and Networks. https://ieeexplore.ieee.org/stamp/stamp.jsp?tp=&arnumber=5231948 (Year: 2009).*

International Search Report and Written Opinion for PCT Appl. No. PCT/CN2022/104171 mailed Dec. 19, 2022 (7 pages).

Examination Report No. 3 for AU Appl. No. 2022468200, dated Aug. 7, 2025 (4 pages).

Notice of Reasons for Rejection for JP Appl. No. 2024-544971, dated Sep. 5, 2025 (with English translation, 9 pages).

3rd Generation Partnership Project; Technical Specification Group Services and System Aspects; Study on Ambient power-enabled Internet of Things (Release 19), 3GPP TR 22.840 V0.1.0 (May 2022), 27 pages.

Extended European Search Report for EP Appl. No. 22949789.6, dated Feb. 5, 2025 (12 pages).

Notice of Reasons for Rejection for JP Appl. No. 2024-544971, dated Jan. 26, 2026 (with English translation, 10 pages).

* cited by examiner

SYSTEMS AND METHODS FOR COMMUNICATION IN PASSIVE/SEMI-PASSIVE INTERNET-OF-THINGS

CROSS-REFERENCE TO RELATED APPLICATION

This application claims the benefit of priority under 35 U.S.C. § 120 as a continuation of PCT Patent Application No. PCT/CN2022/104171, filed on Jul. 6, 2022, the disclosure of which is incorporated herein by reference in its entirety.

TECHNICAL FIELD

The disclosure relates generally to wireless communications, including but not limited to systems and methods for communication in passive/semi-passive Internet-of-Things (IoT).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium of the following. A wireless communication node (e.g., a BS) may determine an identification related to a wireless communication device (e.g., a passive UE). The first wireless communication node may send an authentication instruction message to the wireless communication device. The authentication instruction message may comprise the identification related to the wireless communication device and an identification of the wireless communication node.

In some embodiments, the authentication instruction message may include a preamble sequence, instruction code, the identification related to the wireless communication device, and the identification of the wireless communication node that are arranged in above order along a time domain.

In some embodiments, the wireless communication node may receive a response message acknowledging the authentication instruction message. The wireless communication node may determine that the wireless communication device can be authenticated in response to determining that the response message may indicate that the identification of the wireless communication node may have been received correctly.

In some embodiments, a wireless communication node may send a first type of message or a second type of message to a wireless communication device being authenticated. The wireless communication node may send the second type of message to a wireless communication device not being authenticated. The first type of message may comprise an identification of the wireless communication node. The second type of message may comprise an identification related to the wireless communication device. The first type of message may comprise at least one of: an inventory instruction message, a response trigger instruction message, a reading instruction message, or a writing instruction message.

In some embodiments, the response trigger instruction message may comprise the identification related to the wireless communication device and the identification of the wireless communication node. The reading instruction message may comprise the identification related to the wireless communication device and the identification of the wireless communication node, or the writing instruction message comprises the identification related to the wireless communication device and the identification of the wireless communication node.

In some embodiments, the second type of message may comprise at least one of: a positioning instruction message, or an authentication instruction message. The wireless communication node may send the response trigger instruction message. The response trigger instruction message can be configured to trigger the wireless communication device to send a response message. The wireless communication node may receive the response message. The wireless communication node may determine that the wireless communication device can be within a coverage of the wireless communication node based on the response message.

In some embodiments, the wireless communication node may send one or less of the response trigger instruction message within a same time period and within a frequency resource. The response trigger instruction message may comprise the identification related to the wireless communication device.

In some embodiments, a wireless communication device (e.g., a passive UE) may receive an authentication instruction message comprising an identification related to the wireless communication device and an identification of the wireless communication node from a wireless communication node. The wireless communication device may determine that the identification of the wireless communication device contained in the authentication instruction message may match an identification stored by the wireless communication device. The wireless communication device may send a response message acknowledging the authentication instruction message to the wireless communication node.

In some embodiments, a wireless communication device may receive a first type of message comprising an identification of the wireless communication node from a wireless communication node. The wireless communication device may determine that the first type of message can be invalid in response to determining that the identification of the wireless communication node contained in the first type of message does not match an identification of the wireless communication node stored by the wireless communication device. The first type of message may comprise a response trigger instruction message. The wireless communication device may send a response message acknowledging the response trigger instruction message in response to determining that (i) the identification of the wireless communication node contained in the response trigger instruction message may match an identification of the wireless communication node stored by the wireless communication device; and (ii) the identification of the wireless communication device contained in the response trigger instruction message may match the identification stored by the wireless communication device.

In some embodiments, a wireless communication node (e.g., a BS) may send a positioning instruction message to a wireless communication device. The wireless communication node may estimate a power of a response signal sent by the wireless communication device and responsive to the positioning instruction message. The wireless communication node may determine a position of the wireless communication device based on a plurality (N) of wireless communication nodes that each receive the response signal with highest power. The positioning instruction message may comprise a preamble sequence, instruction code, and an identification of the wireless communication device that can be arranged in above order along a time domain.

In some embodiments, determining the position of the wireless communication device may comprise determining the position based on respective positions of the N wireless communication nodes and respective tilted angles of the N wireless communication nodes. Each of the tilted angles can be defined as a deflection angle of a vector extending from the wireless communication node to the wireless communication device.

In some embodiments, the wireless communication node may send one or less of the positioning instruction message within a same time period and within a frequency resource. The positioning instruction message may comprise an identification of the wireless communication device.

In some embodiments, a wireless communication device (e.g., a passive UE) may receive a positioning instruction message from a wireless communication node. The wireless communication device may determine that an identification of the wireless communication device indicated in the positioning instruction message may match an identification stored by the wireless communication device. The wireless communication device may send a response signal acknowledging the positioning instruction message.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
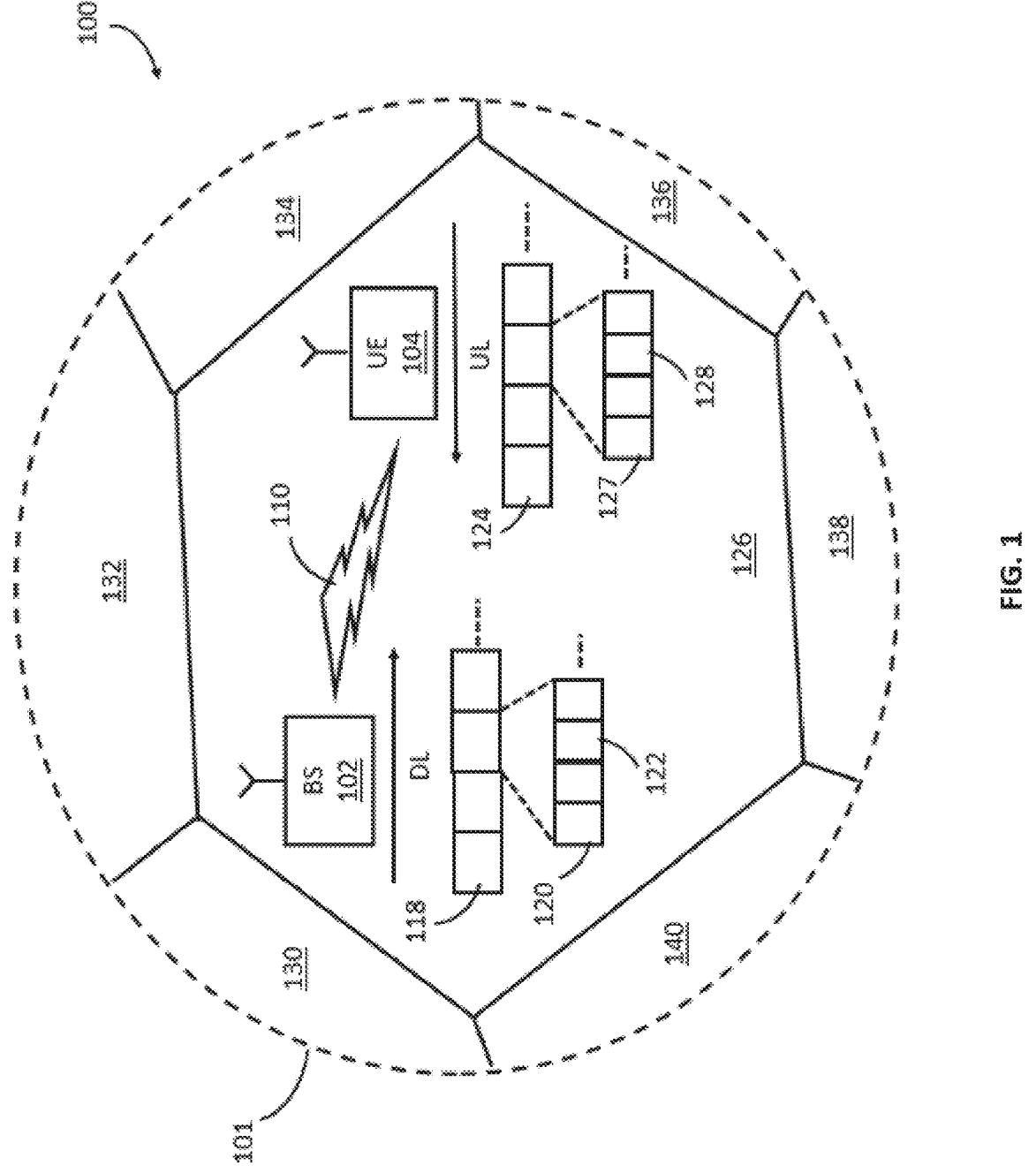
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
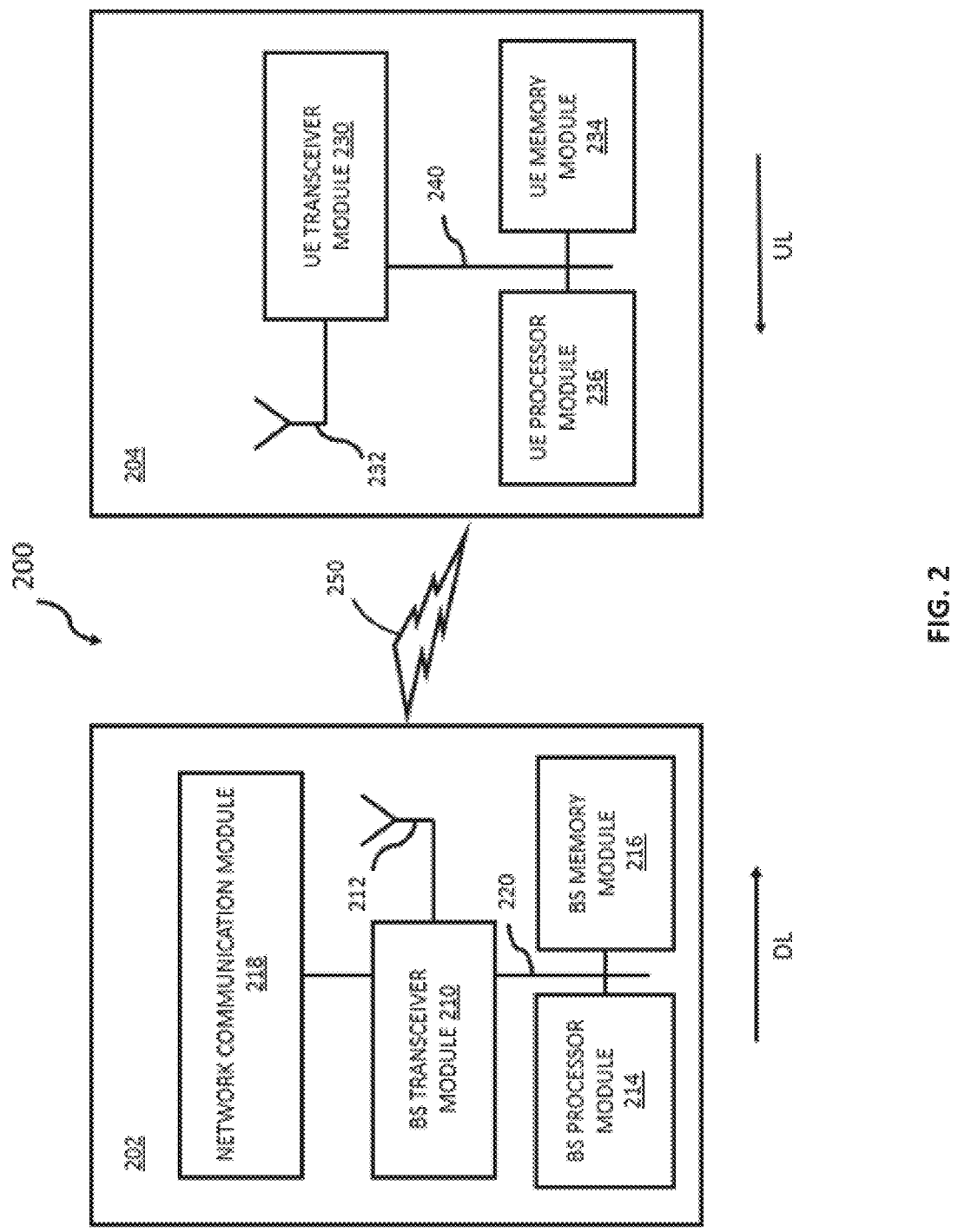
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Communication in Passive/Semi-Passive Internet-of-Things (IoT)

In passive/semi-passive Internet-of-Things (IoT) communication, users may attach/connect/couple passive/semi-passive communication terminals to their assets and items. The users may use communication nodes (e.g., base stations or micro base stations) to implement operations such as taking inventory, positioning, and/or reading and writing information on the assets and items. However, in a coverage area of the base station, there may be passive/semi-passive communication terminals of other users. During communication operations of the user's own assets, a base station signal may be sent to all passive/semi-passive communication terminals within the coverage area. The passive/semi-passive communication terminals of other users may respond to the base station signal, thereby causing an unnecessary increase in network burden and a leakage of privacy and security.

The present invention proposes systems and methods for sending and receiving information, which may enable a base station and a terminal to authenticate each other. Some types of information can be only valid for an authenticated terminal, thereby avoiding unnecessary information feedback from non-authenticated terminals and improving network security. Based on the above methods, the terminal positioning operation can be realized.

In some embodiments, a first communication node can be a transmitting node. A second communication node can be a receiving node.

Implementation Example 1: a Mutual Authentication Between a First Communication Node (e.g., a Base Station or a Micro Base Station) and a Second Communication Node (e.g., Electronic Label)

In some embodiments, a first communication node can be a base station, a micro base station, or a communication device with a reader/writer. A second communication node can be a passive electronic terminal. A third communication node can be a terminal communication device (e.g., a mobile phone) of a user.

In some embodiments, the third communication node (e.g., a UE) may send authentication request information to the first communication node. The authentication request information may include an identification code of the second communication node. The authentication request information can be used to trigger an establishment of a mutual authentication relationship between the first communication node and the second communication node.

In some embodiments, the first communication node may send authentication instruction information to the second communication node or the third communication node. The first communication node may receive the authentication request information. The first communication node may send authentication instruction information to the second communication node (or the third communication node) according to the identification code of the second communication node included in the authentication request information. The authentication instruction information may include the identification code of the first communication node and the identification code of the second communication node (or the third communication node).

In the authentication instruction information, bits corresponding to the identification code of the second communication node (or the third communication node) can be higher than bits of the first communication node. For example, the second communication node (or the third communication node) identification code may correspond to bits of a sequence E. The first communication node identification code may correspond to bits of a sequence D. In the authentication instruction information, the bits of the sequence E can be compared with the bits of the sequence D. The bits of the sequence E can be the high-order bits. The bits of the sequence D can be the low-order bits. The advantage of this processing can be that the second communication node (or the third communication node) may preferentially determine the high-order bits. In the case that the identification code of the second communication node (or the third communication node) contained in the authentication instruction information does not meet the requirements, the second communication node (or the third communication node) may omit the processing or determination of the following bits.

A signal of the authentication instruction information sequentially in a time domain may include a preamble sequence, an instruction code, a second communication node identification code, and a first communication node identification code. The preamble sequence, the instruction code, the second communication node identification code and the first communication node identification code can be discontinuous in the time domain. The second communication node may determine a start time of the authentication instruction information according to the preamble sequence. The second communication node may receive the authentication instruction information regularly or synchronously. The instruction code can be used to indicate the type of instruction. Each instruction code may correspond to an instruction type. The instruction code included in the authentication instruction information may correspond to the authentication instruction type.

The identification code can be a bit sequence. For example, the identification code can be a sequence including 8·G bits. G can be greater than or equal to 1. The identification code can be a complete unique identification number or a part of the unique identification number. The unique identification number can be unique among the first communication nodes or the second communication nodes. The unique identification numbers between different first communication nodes or second communication nodes can be different.

In some embodiments, the second communication node may send confirmation information associated with the authentication instruction information. When the second communication node receives the authentication instruction information, if the identification code of the second communication node included in the authentication instruction information is the same as an identification code of the second communication node, the second communication node may send confirmation information corresponding to the authentication instruction information to the first communication node. The authentication instruction information may include the identification code of the first communication node. The second communication node may store the identification code of the first communication node included in the authentication instruction information.

The confirmation information may include an identification code of the first communication node or a correct decoding indication. The correct decoding indication can be used to notify whether the authentication instruction information is correctly decoded. A signal of the confirmation information may include a preamble sequence and an identification code of the first communication node successively in the time domain. The preamble sequence and the identification code of the first communication node may be discontinuous in the time domain. Alternatively, a signal of the confirmation information may include a preamble sequence, and a correct decoding indication successively in the time domain. The preamble sequence and the correct decoding indication can be discontinuous in the time domain.

In some embodiments, the first communication node may determine that an authentication with the second communication node can be completed according to the confirmation information. The confirmation information may include the identification code of the first communication node. The first communication node may receive the confirmation information. If the identification code of the first communication node is the same as the identification code of the first communication node included in the confirmation information, the authentication between the first communication node and the second communication node can be completed. The first communication node may determine that the second communication node can be an authenticated second communication node.

If the identification code of the first communication node is different from the identification code of the first communication node included in the confirmation information (or if the first communication node does not receive the confirmation information), the first communication node may delay for a fixed time period. After the fixed time period, the first communication node may send the authentication instruction again.

The confirmation information may include a correct decoding indication. The first communication node may receive the confirmation information. If the correct decoding instruction indicates that the authentication instruction information is correctly decoded, the first communication node may determine that the authentication can be completed with the second communication node. The first communication node may determine that the second communication node can be an authenticated second communication node. If the correct decoding instruction indicates that the authentication instruction information is not correctly decoded, the first communication node may resend the authentication instruction after a fixed time delay period.

The first communication node may send first type information or second type information to the authenticated second communication node. The first communication node may send the second type information to a non-authenticated second communication node.

The first type of information may include the first communication node identification code. The first type of information may include at least one of the following: inventory instruction information, response trigger instruction information (e.g., an acknowledgement on trigger message), read instruction information, or write instruction information. The inventory instruction information can be used to obtain a unique identification number of the second communication node. The response trigger instruction information can be used to trigger the second communication node to send response information. The read instruction information can be used to read the stored content of the second communication node. The write instruction information can be used to write the stored content of the second communication node. The response triggering instruction information, the reading instruction information, and the writing instruction information may include the first communication node identification code and the second communication node identification code.

The second type of information may include at least one of the following: authentication instruction information, or positioning instruction information. The positioning instruction information can be used to trigger the second communication node to send a positioning response signal. The second type of information may include a second communication node identification code.

The second communication node may receive the first type information. If the first communication node identification code included in the first type information is different from the first communication identification code stored in the second communication node, the second communication node may determine that the first type of information can be invalid.

The second communication node may receive the first type information. The first type information may include the first communication node identification code and the second communication node identification code. If the identification code of the second communication node stored in the second communication node is the same as the identification code of the second communication node included in the first type information, and the identification code of the first communication identification code stored by the second communication node is the same as the first communication identification code included in the first type information, the second communication node may determine that the first type of information is valid. If the identification code of the second communication node stored in the second communication node is different from the second communication node identification code included in the first type information (or the first communication identification code stored by the second communication node is different from the first communication identification code included in the first type information), the second communication node may determine that the information of the first type can be invalid.

The second communication node may receive the second type information. If the second communication node identification code included in the second type information is the same as the identification code stored in the second communication node, the second communication node may determine that the second type information can valid. Otherwise, the second communication node may determine that the second type information can be invalid.

Implementation Example 2: Coarse Positioning for Authenticating a Second Communication Node (e.g., a Terminal)

In a passive/semi-passive communication process, communication nodes (e.g., readers or base stations) may need to perform an inventory operation on passive/semi-passive electronic terminals to identify passive electronic terminals within a communication range (e.g., passive electronic terminals within the communication range). The terminal may send relevant commands of a dynamic time slot selection algorithm or a Q selection algorithm. The terminals may identify the passive/semi-passive electronic terminals one by one in the time domain. The terminals may obtain a unique identification number of each passive electronic terminal. After the inventory operation is completed, the passive electronic terminal may perform operations such as reading and writing, and sending related commands such as reading information and writing information.

In some embodiments, when a user needs to perform operations such as reading, writing, or positioning on a specific passive/semi-passive electronic terminal, the user can use the terminal communication device (e.g., a mobile phone) to send the unique identification number of the target passive/semi-passive electronic terminal. After obtaining the unique identification number of the target passive/semi-passive electronic terminal, a communication node (e.g., a reader or a base station) can use the unique identification number to directly send relevant command signals for operations such as reading, writing or positioning to the target passive/semi-passive electronic terminal. And no additional inventory operations can be required prior to the operations.

In some embodiments, the first communication node may send a response trigger instruction information. The response trigger instruction information may include the first communication node identification code and the second communication node identification code. The response trigger instruction information can be used to trigger the second communication node to send response information. A signal of the response trigger instruction information sequentially in the time domain may include a preamble sequence, an instruction code, a first communication node identification code, and a second communication node identification code. The preamble sequence, the instruction code, the first communication node identification code and the second communication node identification code can be discontinuous in the time domain. The instruction code may correspond to the response trigger instruction type in the frame structure of the response trigger instruction.

In some embodiments, the second communication node may send response information corresponding to the response trigger instruction information. When the second communication node receives the response trigger instruction information, if the identification code of the second communication node is the same as the second communication node identification code included in the response trigger instruction information, and the first communication node identification code stored by the second communication node is the same as the first communication node identification code included in the response trigger instruction information, the second communication node may send the response information corresponding to the response trigger instruction information. Otherwise, the second communication node may determine that the response triggering instruction information can be invalid.

The identification code can be a bit sequence. For example, the identification code can be a sequence including $8 \cdot G$ bits. G can be greater than or equal to 1. The identification code can be a complete unique identification number or a part of the unique identification number. The unique identification number can be unique among the first communication nodes or the second communication nodes. The unique identification numbers between different first communication nodes or second communication nodes can be different.

In some embodiments, the first communication node may determine an area where the second communication node can be located according to the response information. The first communication node may receive the response information. The response information can be a fixed format signal. The first communication node may receive the response information. If the received response information conforms to the fixed format, the first communication node may determine that the response information can be detected. The first communication node may determine that the second communication node can be located at a coverage of the first communication node. Otherwise, the first communication node may determine that the second communication node can be outside the coverage of the first communication node.

The response information can be a fixed-format signal. The receiving end can obtain a peak power by detecting the response information. If the first communication node detects the peak power, the first communication node may determine that the second communication node can be located within the coverage of the first communication node. Otherwise, the first communication node may determine that the second communication node can be located out of the coverage of the first communication node.

The response information may include bit information. If the first communication node decodes the response information correctly, the first communication node may determine that the second communication node can located within the coverage of the first communication node. Otherwise, the first communication node may determine that the second communication node can be outside the coverage area of the first communication node.

On one frequency domain resource, the first communication node may send less than or equal to one of the response trigger instruction information at the same time. The response trigger instruction information may include a second communication node identification code.

Implementation Example 3: Precise Positioning for a Second Communication Node

In a passive/semi-passive communication process, communication nodes (e.g., readers or base stations) may need to perform an inventory operation on passive/semi-passive electronic terminals to identify passive electronic terminals within a communication range (e.g., passive electronic terminals within the communication range). The terminal may send relevant commands of a dynamic time slot selection algorithm or a Q selection algorithm. The terminals may identify the passive/semi-passive electronic terminals one by one in the time domain. The terminals may obtain a unique identification number of each passive electronic terminal. After the inventory operation is completed, the passive electronic terminal may perform operations such as reading and writing, and sending related commands such as reading information and writing information.

In some embodiments, when a user needs to perform operations such as reading, writing, or positioning on a specific passive/semi-passive electronic terminal, the user can use the terminal communication device (e.g., a mobile phone) to send the unique identification number of the target passive/semi-passive electronic terminal. After obtaining the unique identification number of the target passive/semi-passive electronic terminal, a communication node (e.g., a reader or a base station) can use the unique identification number to directly send relevant command signals for operations such as reading, writing or positioning to the target passive/semi-passive electronic terminal. And no additional inventory operations can be required prior to the operations.

In some embodiments, the first communication node may send positioning instruction information. The positioning instruction information may include the identification code of the second communication node.

A signal of the positioning instruction information sequentially in the time domain may include a preamble sequence, an instruction code, and a second communication node identification code. The preamble sequence, the instruction code, and the second communication node identification code can be discontinuous in the time domain. The instruction code may correspond to a type of positioning instruction. The identification code can be a bit sequence. For example, the identification code can be a sequence including 8·G bits. G can be greater than or equal to 1. The identification code can be a complete unique identification number or a part of the unique identification number. The unique identification number can be unique among the first communication nodes or the second communication nodes. The unique identification numbers between different first communication nodes or second communication nodes can be different.

In some embodiments, the second communication node may send a response signal for positioning instruction information. The second communication node may receive the positioning instruction information. If the identification code of the second communication node contained in the positioning instruction information is the same as its own identification code, the second communication node may send a response signal for the positioning instruction information. The response signal may include location information of the second communication node. Alternatively, the response signal can be a fixed-format signal. The first communication node may obtain a power peak when the fixed-format signal is detected.

In some embodiments, the first communication node may determine the position of the second communication node according to the response signal. The first communication node may receive the response signal. According to the response signal, the first communication node may determine the position of the second communication node. The response signal may include location information of the second communication node. The first communication node can determine the location of the second communication node according to the location information.

Alternatively, the response signal can a fixed format signal. The first communication node may determine the position of the second communication node from N first communication nodes with strongest received power of the response signal. The first communication node may detect the response signal to obtain detection power. The N first communication nodes with the highest detection power may jointly determine the position of the second communication node. N can be greater than or equal to 2. Among the N first communication nodes, each first communication node may determine a deflection angle according to the receiving direction of the response signal. The deflection angle can be the angle of the vector direction from the first communication node to the second communication node. The second communication node can be determined according to the positions of the N first communication nodes and the deflection angles of the N first communication nodes. In some embodiments, determining the position of the wireless communication device may comprise determining the position based on respective positions of the N wireless communication nodes and respective tilted angles of the N wireless communication nodes. Each of the tilted angles can be defined as a deflection angle of a vector extending from the wireless communication node to the wireless communication device.

On one frequency domain resource, the first communication node may send less than or equal to one of the positioning instruction information at the same time. The positioning instruction information may include a second communication node identification code.

Figure 3:
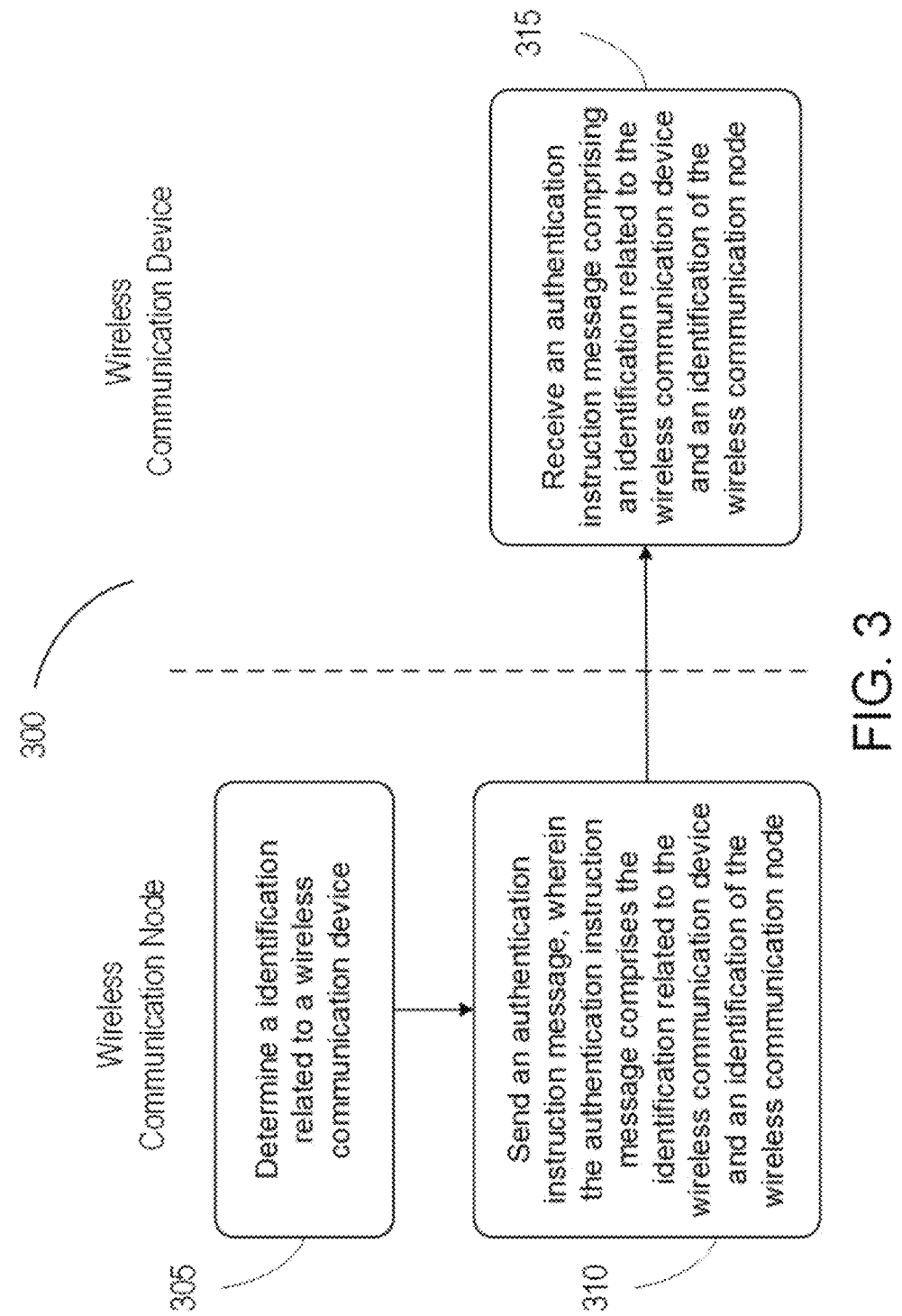
FIG. 3 illustrates a flow diagram for communication in passive/semi-passive Internet-of-Things (IoT), in accordance with an embodiment of the present disclosure.

FIG. 3 illustrates a flow diagram of a method 300 for communication in passive/semi-passive Internet-of-Things (IoT). The method 300 may be implemented using any one or more of the components and devices detailed herein in conjunction with FIGS. 1-2. In overview, the method 300 may be performed by a wireless communication node, in some embodiments. Additional, fewer, or different operations may be performed in the method 300 depending on the embodiment. At least one aspect of the operations is directed to a system, method, apparatus, or a computer-readable medium.

A wireless communication node (e.g., a BS) may determine an identification related to a wireless communication device (e.g., a passive UE). The first wireless communication node may send an authentication instruction message to the wireless communication device. The authentication instruction message may comprise the identification related to the wireless communication device and an identification of the wireless communication node.

In some embodiments, the authentication instruction message may include a preamble sequence, instruction code, the identification related to the wireless communication device, and the identification of the wireless communication node that are arranged in above order along a time domain.

In some embodiments, the wireless communication node may receive a response message acknowledging the authentication instruction message. The wireless communication node may determine that the wireless communication device can be authenticated in response to determining that the response message may indicate that the identification of the wireless communication node may have been received correctly.

In some embodiments, a wireless communication node may send a first type of message or a second type of message to a wireless communication device being authenticated. The wireless communication node may send the second type of message to a wireless communication device not being authenticated. The first type of message may comprise an identification of the wireless communication node. The second type of message may comprise an identification related to the wireless communication device. The first type of message may comprise at least one of: an inventory instruction message, a response trigger instruction message, a reading instruction message, or a writing instruction message.

In some embodiments, the response trigger instruction message may comprise the identification related to the wireless communication device and the identification of the wireless communication node. The reading instruction message may comprise the identification related to the wireless communication device and the identification of the wireless communication node, or the writing instruction message comprises the identification related to the wireless communication device and the identification of the wireless communication node.

In some embodiments, the second type of message may comprise at least one of: a positioning instruction message, or an authentication instruction message. The wireless communication node may send the response trigger instruction message. The response trigger instruction message can be configured to trigger the wireless communication device to send a response message. The wireless communication node may receive the response message. The wireless communication node may determine that the wireless communication device can be within a coverage of the wireless communication node based on the response message.

In some embodiments, the wireless communication node may send one or less of the response trigger instruction message within a same time period and within a frequency resource. The response trigger instruction message may comprise the identification related to the wireless communication device.

In some embodiments, a wireless communication device (e.g., a passive UE) may receive an authentication instruction message comprising an identification related to the wireless communication device and an identification of the wireless communication node from a wireless communication node. The wireless communication device may determine that the identification of the wireless communication device contained in the authentication instruction message may match an identification stored by the wireless communication device. The wireless communication device may send a response message acknowledging the authentication instruction message to the wireless communication node.

In some embodiments, a wireless communication device may receive a first type of message comprising an identification of the wireless communication node from a wireless communication node. The wireless communication device may determine that the first type of message can be invalid in response to determining that the identification of the wireless communication node contained in the first type of message does not match an identification of the wireless communication node stored by the wireless communication device. The first type of message may comprise a response trigger instruction message. The wireless communication device may send a response message acknowledging the response trigger instruction message in response to determining that (i) the identification of the wireless communication node contained in the response trigger instruction message may match an identification of the wireless communication node stored by the wireless communication device; and (ii) the identification of the wireless communication device contained in the response trigger instruction message may match the identification stored by the wireless communication device.

In some embodiments, a wireless communication node (e.g., a BS) may send a positioning instruction message to a wireless communication device. The wireless communication node may estimate a power of a response signal sent by the wireless communication device and responsive to the positioning instruction message. The wireless communication node may determine a position of the wireless communication device based on a plurality (N) of wireless communication nodes that each receive the response signal with highest power. The positioning instruction message may comprise a preamble sequence, instruction code, and an identification of the wireless communication device that can be arranged in above order along a time domain.

In some embodiments, determining the position of the wireless communication device may comprise determining the position based on respective positions of the N wireless communication nodes and respective tilted angles of the N wireless communication nodes. Each of the tilted angles can be defined as a deflection angle of a vector extending from the wireless communication node to the wireless communication device.

In some embodiments, the wireless communication node may send one or less of the positioning instruction message within a same time period and within a frequency resource. The positioning instruction message may comprise an identification of the wireless communication device.

In some embodiments, a wireless communication device (e.g., a passive UE) may receive a positioning instruction message from a wireless communication node. The wireless communication device may determine that an identification of the wireless communication device indicated in the positioning instruction message may match an identification stored by the wireless communication device. The wireless communication device may send a response signal acknowledging the positioning instruction message.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
   determining, by a wireless communication node, an identification related to a wireless communication device; and
   sending, by the wireless communication node to the wireless communication device, an authentication instruction message,
   wherein the authentication instruction message comprises a preamble sequence, an instruction code, the identification related to the wireless communication device, and an identification of the wireless communication node, that are arranged in above order along a time domain.

2. The wireless communication method of claim 1, further comprising:
   receiving, by the wireless communication node, a response message acknowledging the authentication instruction message; and
   determining, by the wireless communication node, that the wireless communication device is authenticated in response to determining that the response message indicates that the identification of the wireless communication node has been received correctly.

3. A non-transitory computer-readable medium having code stored thereupon, the code, when executed by at least one processor, causes the at least one processor to implement the method of claim 1.

4. A non-transitory computer-readable medium having code stored thereupon, the code, when executed by at least one processor, causes the at least one processor to implement the method of claim 2.

5. A wireless communication method, comprising:
   receiving, by a wireless communication device from a wireless communication node, an authentication instruction message comprising a preamble sequence, an instruction code, an identification related to the wireless communication device, and an identification of the wireless communication node, that are arranged in above order;

determining, by the wireless communication device, that the identification of the wireless communication device contained in the authentication instruction message matches an identification stored by the wireless communication device; and sending, by the wireless communication device to the wireless communication node, a response message acknowledging the authentication instruction message.

6. The wireless communication method of claim 5, further comprising:

sending, by the wireless communication device, a response message acknowledging the authentication instruction message, wherein the wireless communication node determines that the wireless communication device is authenticated in response to determining that the response message indicates that the identification of the wireless communication node has been received correctly.

7. A non-transitory computer-readable medium having code stored thereupon, the code, when executed by at least one processor, causes the at least one processor to implement the method of claim 5.

8. A non-transitory computer-readable medium having code stored thereupon, the code, when executed by at least one processor, causes the at least one processor to implement the method of claim 6.

9. A wireless communication node, comprising:

at least one processor configured to:

determine an identification related to a wireless communication device; and send, via a transmitter to the wireless communication device, an authentication instruction message, wherein the authentication instruction message comprises a preamble sequence, an instruction code, the identification related to the wireless communication device, and an identification of the wireless communication node, that are arranged in above order.

10. The wireless communication node of claim 9, wherein the at least one processor is configured to:

receive, via a receiver, a response message acknowledging the authentication instruction message; and determine that the wireless communication device is authenticated in response to determining that the response message indicates that the identification of the wireless communication node has been received correctly.

11. A wireless communication device, comprising:

at least one processor configured to:

receive, via a transceiver from a wireless communication node, an authentication instruction message comprising a preamble sequence, an instruction code, an identification related to the wireless communication device, and an identification of the wireless communication node, that are arranged in above order;

determine that the identification of the wireless communication device contained in the authentication instruction message matches an identification stored by the wireless communication device; and send, via the transceiver to the wireless communication node, a response message acknowledging the authentication instruction message.

12. The wireless communication device of claim 11, wherein the at least one processor is configured to:

send, via the transceiver, a response message acknowledging the authentication instruction message, wherein the wireless communication node determines that the wireless communication device is authenticated in response to determining that the response message indicates that the identification of the wireless communication node has been received correctly.

* * * * *